Nov. 15, 1949    D. E. TRUCKSESS    2,488,350
RECTIFYING APPARATUS
Filed July 13, 1948
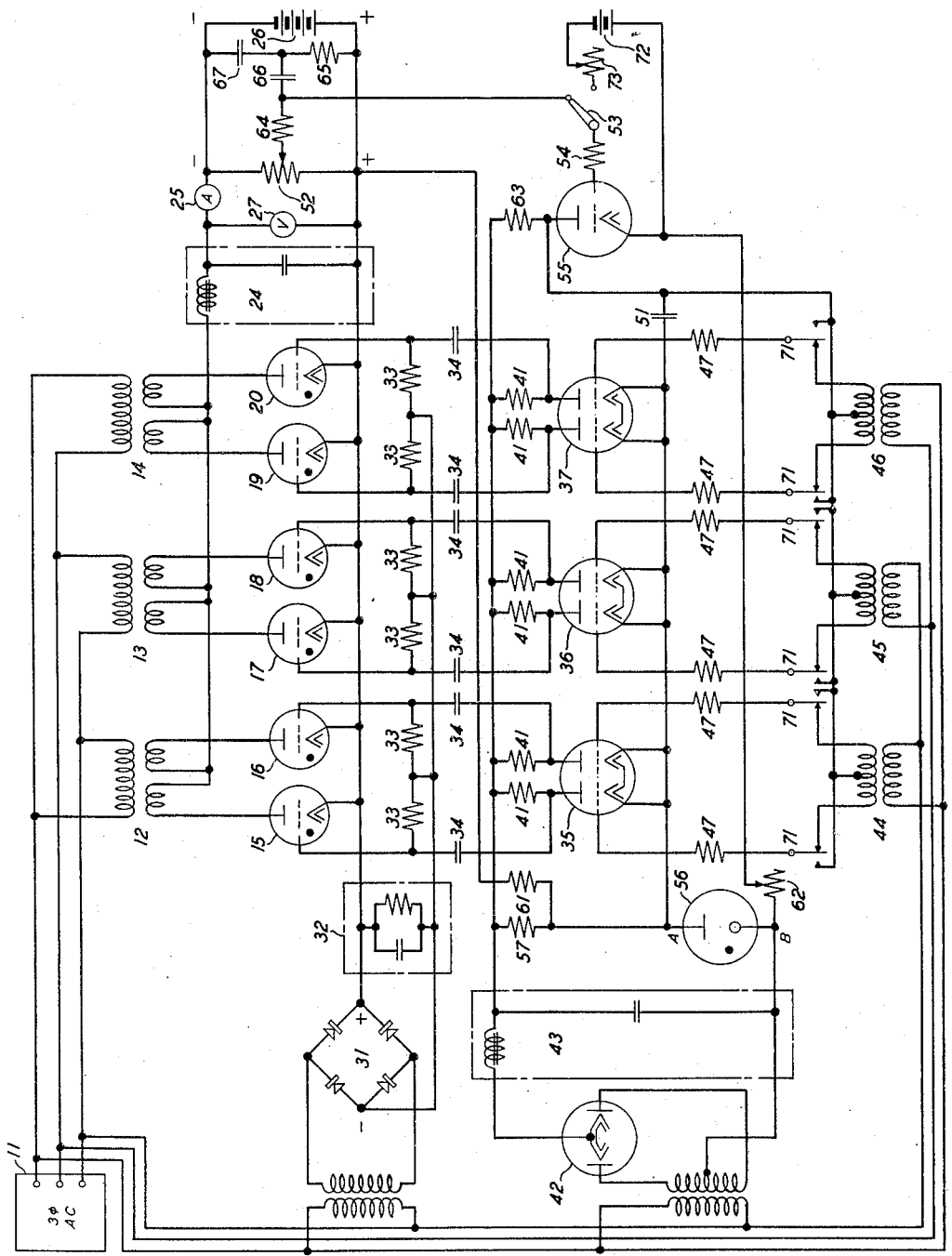
INVENTOR
D. E. TRUCKSESS
BY
H. A. Burgess
ATTORNEY Patented Nov. 15, 1949

2,488,350

UNITED STATES PATENT OFFICE 2,488,350

RECTIFYING APPARATUS

David E. Trucksess, Summit, N. J., assignor to Bell Telephone Laboratories, Incorporated, New York, N. Y., a corporation of New York Application July 13, 1948, Serial No. 38,535

4 Claims. (Cl. 315—131)

This invention relates to regulators for alternating current rectifying systems.

An object of this invention is to test gas-filled, grid controlled thermionic tubes without removing them from service.

A further object is to inhibit the firing of any one of or any combination of the component gas-filled, grid controlled tubes of a multiphase rectifier.

It is also an object of this invention to utilize the deactivation of these tubes as a check of their merits as individual tubes, or in combinations thereof.

In a system of the type disclosed herein a rectifying system is interposed between an alternating current source and a load to which unidirectional current is to be supplied. This rectifying system is preferably a multiphase regulated rectifier of the type disclosed in an application of William H. Bixby, Serial No. 35,948, filed June 29, 1948.

Such a system comprises a plurality of gas-filled, grid controlled thermionic tubes, viz., thyratrons, each biased below firing potential. Each tube in turn is caused to fire by positive voltage pulses impressed on its grid. These pulses are generated by grid controlled vacuum tubes. The control voltage for these vacuum tubes which causes the pulses to form is the combination of a fixed alternating potential and a regulating voltage in the nature of variable direct current. This latter voltage depends on feedback from the output of the rectifying system and shifts the phase angle of the firing pulses and consequently the relative firing time of the gas tubes, as more fully described in the aforementioned Bixby application. Compensation is thus attained for any deviations in output voltage as compared in part to a reference standard voltage.

In such a system it is difficult to detect faulty operation of any one thyratron due to the regulating effect of the feedback system. The faulty operation of any one tube will tend to cause a change in the output voltage of the rectifier but the regulating feedback circuit will effect a corrected output from the other tubes. Due to this inherent feature, a faulty tube may remain undetected for a considerable length of time except for means embodied in the present invention whereby faulty tubes may readily be ferreted out.

In applying the invention, a switch is inserted in the grid circuit of each of the pulse firing tubes. In normal position, the circuit is connected to operate as disclosed above and in the aforementioned Bixby application. When this switch is operated, the fixed phase alternating source is removed from the grid of the particular pulse tube involved. Without this potential no pulse is formed since the regulating voltage still impressed on the grid is direct current in nature. Therefore, the grid of the thyratron normally fired by this particular pulse tube will remain negative due to its fixed bias and will not fire.

But as explained before, one inoperative thyratron will not cause an appreciable change in the output of the rectifier due to the regulation by the feedback circuit. This invention therefore also embodies a manually controlled voltage to be substituted for the feedback voltage by means of a switch in the feedback circuit. With this switch operated there will be no automatic regulation and with a pulse tube grid switch also operated, the output will reflect the change caused by the deactivation of the particular thyratron involved. This departure from normal can be interpreted as representing a good, poor but serviceable, or unserviceable tube.

Although the specific embodiment about to be described discloses a three phase star connected set of six thyratrons, the invention is obviously adaptable to other multiphase connections. The magnitude of the change in output due to the operation of one pulse tube grid switch is of course dependent on the number of firing cycles and also on the number of tubes firing per cycle. The invention should not however be limited by this relative adaptability.

The single figure of the drawing shows a preferred embodiment of the invention. Aspects and features of the invention other than those already presented will become apparent from a consideration of the following detailed specification taken in connection with the drawing.

A source 11 of alternating current to be rectified is connected through power transformers 12, 13, and 14 to a three phase star connected set of thyratrons 15 to 20 inclusive. Output leads from the thyratrons are connected through smoothing filter 24 and ammeter shunt 25 to the battery 26. Output voltage is measured by voltmeter 27. Each thyratron is biased below firing potential by bias rectifier 31 with associated filter 32 and bias resistor 33.

The grids of the six thyratrons are each connected to their individual pulse firing condenser 34. Pulses are generated by double-triodes 35, 36, and 37 in combination with their plate resistances 41. The plate supply for these triodes is full wave rectifier 42 with associated filter 43.

A fixed alternating potential is impressed on the grids of these triodes through transformers 44, 45, and 46. This potential is in series with grid resistor 47 and capacitor 51, the latter being common to the grid-cathode circuits of all the triodes.

As more fully described in the Bixby application, the alternating potential on the triode grids swings from negative to positive and positive to negative at a relatively high rate, with the maximum rate of change occurring as it swings through zero. At this maximum rate of change there is a sudden change in plate current and the sudden change in voltage drop across the plate resistor 41 is transmitted through capacitor 34 to the grid of a thyratron as a pulse. This pulse has sufficient amplitude to overcome the fixed negative bias and cause the tube to fire when it is of the proper polarity and in correct phase relationship with the thyratron plate voltage. In-phase positive pulses will be formed when the potential on the pulse tube grid swings negative and only then will the thyraton fire. Plate current continues as dictated by thyratron plate voltage conditions.

The phase angles of these pulses are controlled by a regulating voltage which modifies the potential on capacitor 51. This regulating voltage is derived by feeding back a portion of the rectifier output voltage and comparing it with a reference standard voltage. The feedback voltage is tapped from the output leads by potentiometer 52 and is fed through switch 53 and grid resistor 54 to the grid of voltage regulator amplifier 55.

The reference voltage for the regulator is glow discharge tube 56 energized through ballast resistor 57 from the triode plate supply rectifier 42. Terminal A of glow discharge tube 56 is the positive of this reference voltage supply and is coupled through resistor 61 directly to the positive regulating lead. Potentiometer 62 couples the negative terminal B to the cathode of voltage regulating tube 55.

In this manner a fraction of the output voltage measured by voltmeter 27 is compared to the reference standard voltage measured from A to B of tube 56 and the modified difference voltage becomes the cathode-grid voltage of voltage regulating tube 55. The overall relationship in the regulating circuit is that of degenerative feedback and the net effect is to stabilize the output voltage of the rectifier at the value set by means of potentiometer 52. As indicated before, the output of regulating tube 55 is in the nature of variable direct current and through plate resistor 63 modifies the voltage on capacitor 51.

It is thus seen that the grid-cathode circuit of each pulse generating triode consists of a fixed alternating potential supplied by transformer 44, 45, or 46 and a regulating potential across capacitor 51 both in series with a grid resistor 47. By the nature of the three-phase supply and the split secondaries of both the thyratron power supply transformers 12, 13, and 14 and the fixed potential transformers 44, 45, and 46, it is evident that there will be six firing cycles, each thyratron firing in turn. The relative firing times of these tubes is constantly adjusted by the voltage on capacitor 51 to maintain the output voltage as measured by voltmeter 27 substantially constant.

Associated with the output of the rectifier is an anti-hunt network consisting of resistors 64 and 65 and capacitors 66 and 67. This RC network provides a time constant which may be adjusted to slow the changes in the input signal and so prevent hunting. This filter also serves to reduce ripple frequency voltage which might interfere with regulation.

The rectifier and regulating circuits have been described as operating under normal conditions and merely provide background for the invention about to be described.

Interposed in the grid-cathode circuit of each of the pulse generating triodes between grid resistor 47 and the portion of transformer 44, 45, or 46 which supplies the fixed alternating potential is a switch 71 shown in normal position. By operating this switch, the fixed alternating voltage is removed from the grid-cathode circuit and only the regulating voltage across capacitor 51 remains impressed on the grid of the triode involved. This voltage will not cause a pulse to form because of its direct current nature and the thyratron associated with the operated grid switch will not fire.

The rectifier output will tend to change when a grid switch 71 is operated but the regulating circuit will rapidly effect a compensated output from the active thyratrons and tend to hold the output voltage constant. So that changes in output may be evident when these grid switches 71 are operated, the invention also embodies a fixed bias 72 controlled by potentiometer 73 to substitute for the feedback voltage on the grid of the voltage regulating tube 55. This substitution is effected by operating switch 53. This operation is preferably made prior to the operation of any switch 71 so that bias 72 may be adjusted to substantially equal the feedback voltage. The operation of a switch 71 will now effect a change in the rectifier output depending on the condition of the thyratron effected by the particular switch operated.

Checking procedure can easily be established by recording readings of output voltage after operating the various grid switches 71. By using thyratrons of known quality, a chart or curve can easily be prepared to show the deviation in output to be expected with tubes characterized by different degrees of serviceability and with different settings of the manually controlled bias 72. Once the chart has been prepared, subsequent tubes can readily be checked and faulty tubes detected.

It may be advantageous to check the tubes in pairs or other multiples. The check chart would then be expanded to show output deviations resulting from the operation of more than one grid switch, for any number desired.

Although the invention has been described as relating to a specific embodiment, it should be understood that there are many variations possible without deviating from the spirit of the invention.

What is claimed is:

1. The combination in a multiphase rectifier of a plurality of gas-filled space current devices each having at least an anode, a cathode and a control electrode, means for biasing said control electrode negatively below firing potential with respect to said cathode, a plurality of means, one for each of said devices, for generating and superimposing on said control grids with respect to said cathodes pulses for starting space current conduction in said devices, said pulses being generated cyclically and in succession, indicating means responsive to the output energy of said rectifier, manually controlled means for selectively disabling any one of said pulse generating means whereby a change or lack of change in the indication of said indication means may be observed.

2. In combination with claim 1, a degenerative feedback means for regulating the relative phase angles of said pulses, manually controlled means for substituting a substantially fixed potential for the feedback potential of said feedback means whereby changes in the indication of said indication means may more readily be observed.

3. A multiphase rectifier comprising a plurality of thyratrons, means for cyclically and in succession causing said thyratrons to conduct space current, indicating means responsive to the output of said rectifier, means under the control of an operator for selectively disabling said means for causing said thyratrons to conduct, whereby a change or lack of change in the output of said rectifier may be observed and interpreted as an indication of the relative merits of said thyratrons.

4. A multiphase rectifier comprising a plurality of thyratrons, means for cyclically and in succession causing said thyratrons to conduct space current, means responsive to the output voltage of said rectifier for controlling said first means, means under the control of an operator for making said second means responsive to a manually controlled bias instead of said output voltage, switch means for selectively disabling said first means, indicating means responsive to the output of said rectifier whereby changes in output may be observed in combination with the operation of said operator controlled means and said switching means.

DAVID E. TRUCKSESS.

No references cited.